US011212773B2

(12) United States Patent
Shukair et al.

(10) Patent No.: US 11,212,773 B2
(45) Date of Patent: Dec. 28, 2021

(54) COMMUNICATION OF SIDELINK TRANSMISSION PATTERN TO WIRELESS WIDE AREA NETWORK (WWAN)

(71) Applicant: QUALCOMM Incorporated, San Diego, CA (US)

(72) Inventors: Mutaz Shukair, San Diego, CA (US); Feng Lu, Santa Clara, CA (US); Mouaffac Ambriss, San Diego, CA (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/452,293

(22) Filed: Jun. 25, 2019

(65) Prior Publication Data
US 2020/0008176 A1 Jan. 2, 2020

Related U.S. Application Data

(60) Provisional application No. 62/690,870, filed on Jun. 27, 2018.

(51) Int. Cl.
*H04W 72/02* (2009.01)
*H04W 76/14* (2018.01)
(Continued)

(52) U.S. Cl.
CPC ............. *H04W 72/02* (2013.01); *H04W 8/24* (2013.01); *H04W 28/0215* (2013.01);
(Continued)

(58) Field of Classification Search
CPC ....... H04W 72/02; H04W 76/14; H04W 8/24; H04W 28/0215; H04W 52/367; H04W 72/10
See application file for complete search history.

(56) References Cited

U.S. PATENT DOCUMENTS 10,791,551 B2* 9/2020 Panteleev ......... H04W 72/1289
2013/0258996 A1* 10/2013 Jung ................. H04W 72/1284
370/330
(Continued)

FOREIGN PATENT DOCUMENTS

WO 2017172479 A1 10/2017

OTHER PUBLICATIONS

International Search Report and Written Opinion—PCT/US2019/039295—ISA/EPO—dated Sep. 6, 2019.

*Primary Examiner* — Khaled M Kassim
(74) *Attorney, Agent, or Firm* — Loza & Loza, LLP

(57) ABSTRACT

Aspects of the disclosure relate to mechanisms for a user equipment for indicating resources having limited wireless wide area network (WWAN) transmission capability. In some examples, a user equipment indicates a sidelink transmission pattern to a WWAN, receives one or more uplink transmission grants for the WWAN based on at least the sidelink transmission pattern, and transmits at least one of first data to a second user equipment on a sidelink channel based on the sidelink transmission pattern or second data to the WWAN based on the one or more uplink transmission grants. In some examples, the user equipment transmits a sidelink transmission configuration to the WWAN, the sidelink transmission configuration including one or more sidelink transmission patterns. In some examples, the user equipment selects a sidelink transmission pattern from among the one or more sidelink transmission patterns based on expected sidelink transmissions.

31 Claims, 11 Drawing Sheets

(51) Int. Cl.
*H04W 8/24* (2009.01)
*H04W 28/02* (2009.01)
*H04W 52/36* (2009.01)
*H04W 72/10* (2009.01)

(52) U.S. Cl.
CPC ......... *H04W 52/367* (2013.01); *H04W 72/10* (2013.01); *H04W 76/14* (2018.02)

(56) References Cited

U.S. PATENT DOCUMENTS

| | | | |
|---|---|---|---|
| 2015/0271800 A1* | 9/2015 | Panteleev | H04W 72/042 370/329 |
| 2016/0095112 A1* | 3/2016 | Panteleev | H04W 72/1289 370/329 |
| 2016/0345297 A1* | 11/2016 | Chen | H04W 72/02 |
| 2017/0019943 A1* | 1/2017 | Wang | H04W 76/14 |
| 2017/0027015 A1* | 1/2017 | Wijesinghe | H04W 40/16 |
| 2017/0150501 A1* | 5/2017 | Park | H04W 72/0446 |
| 2017/0295601 A1 | 10/2017 | Kim et al. | |
| 2018/0263019 A1* | 9/2018 | Jung | H04W 72/04 |
| 2020/0059944 A1* | 2/2020 | Lee | H04W 72/1284 |
| 2020/0077434 A1* | 3/2020 | Kim | H04W 4/46 |
| 2020/0137539 A1* | 4/2020 | Brahmi | H04W 74/0825 |
| 2020/0305165 A1* | 9/2020 | Inokuchi | H04W 28/14 |

* cited by examiner

COMMUNICATION OF SIDELINK TRANSMISSION PATTERN TO WIRELESS WIDE AREA NETWORK (WWAN)

PRIORITY CLAIM

This application claims priority to and the benefit of Provisional Patent Application No. 62/690,870, entitled "A Method and System for Indicating Resources Limited for Wireless Wide Area Network (WWAN) Transmissions in Devices with WWAN and Sidelink Transmission Capability," filed in the U.S. Patent and Trademark Office on Jun. 27, 2018, the entire contents of which are incorporated herein by reference as if fully set forth below in their entirety and for all applicable purposes.

TECHNICAL FIELD

The technology discussed below relates generally to wireless communication systems, and more particularly, to indicating resources utilized for sidelink traffic to a wireless wide area network (WWAN).

INTRODUCTION

Wireless wide area network (WWAN) signal processing (e.g., Long Term Evolution (LTE) signal processing and/or 5G signal processing) and sidelink signal processing (e.g., Cellular Vehicle-to-Everything (C-V2X) signal processing) may be integrated in one device, such as a hardware modem of a wireless communication device (e.g., a smartphone, a laptop computer, etc.). Modems having both WWAN and C-V2X capability may need to share the same limited resources, such as time-frequency resources, transmission power, and/or computation bandwidth. For example, WWAN and CV2X transmissions may compete for resources in a given subframe. Such competition may lead to a degradation in one or both of the C-V2X and WWAN networks.

As the demand for C-V2X communication increases, research and development continue to advance C-V2X technologies not only to meet the growing demand for C-V2X, but also to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, a method for a user equipment is disclosed. The method includes indicating a sidelink transmission pattern to a wireless wide area network (WWAN), receiving one or more uplink transmission grants for the WWAN based on at least the sidelink transmission pattern, and transmitting at least one of first data to a second user equipment on a sidelink channel based on the sidelink transmission pattern or second data to the WWAN based on the one or more uplink transmission grants.

In one example, an apparatus for wireless communication is disclosed. The apparatus includes a processor, a transceiver communicatively coupled to the processor, and a memory communicatively coupled to the processor. The processor is configured to indicate a sidelink transmission pattern to a WWAN, receive one or more uplink transmission grants for the WWAN based on at least the sidelink transmission pattern, and transmit at least one of first data to a user equipment on a sidelink channel based on the sidelink transmission pattern or second data to the WWAN based on the one or more uplink transmission grants.

In one example, a method for a base station is disclosed. The method includes receiving an indication of a sidelink transmission pattern from a user equipment, and allocating one or more uplink transmission grants for a WWAN to the user equipment based on at least the sidelink transmission pattern.

In one example, an apparatus for wireless communication is disclosed. The apparatus includes a processor, a transceiver communicatively coupled to the processor, and a memory communicatively coupled to the processor. The processor is configured to receive an indication of a sidelink transmission pattern from a user equipment, and allocate one or more uplink transmission grants for a wireless wide area network (WWAN) to the user equipment based on at least the sidelink transmission pattern.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
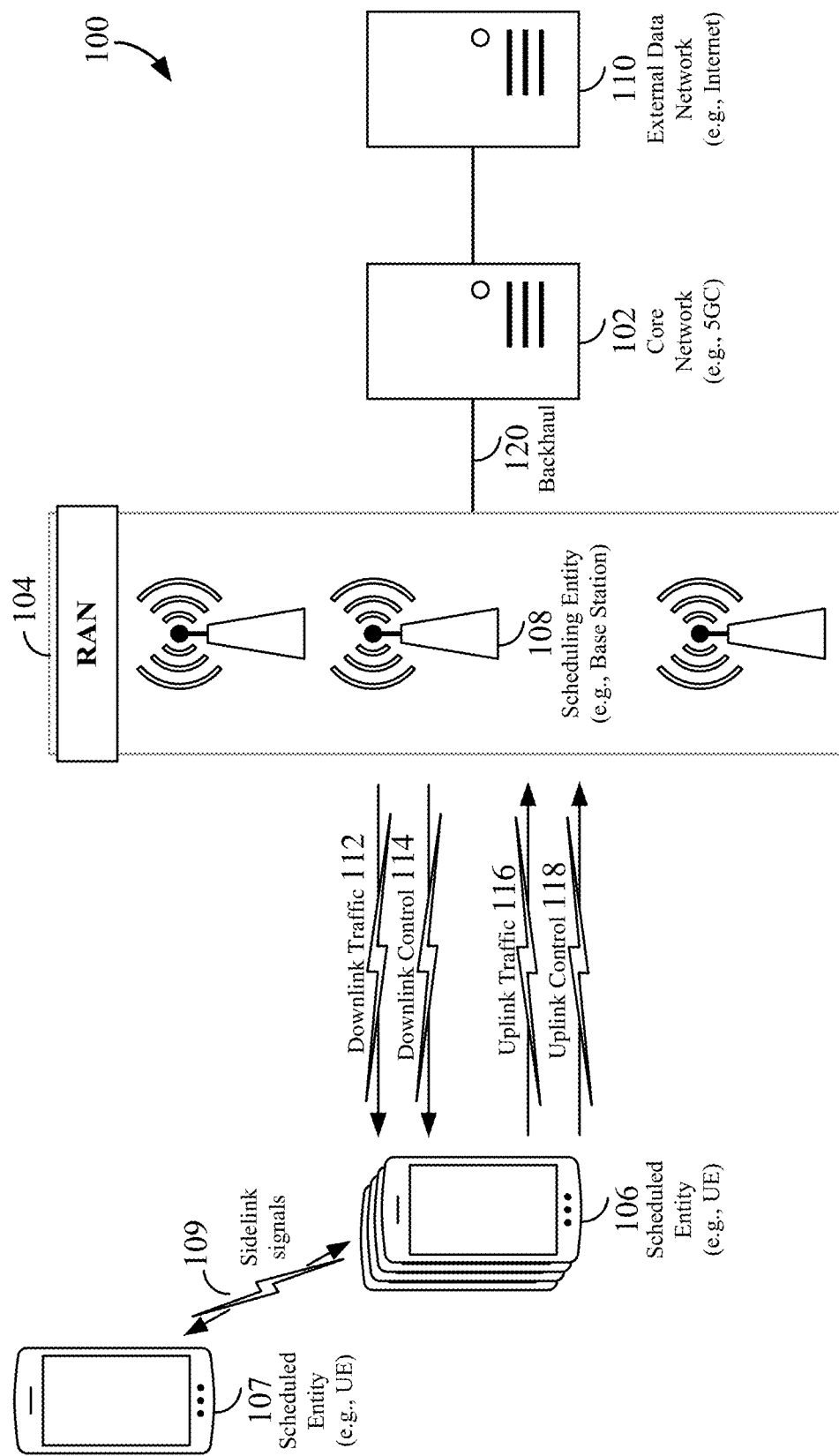
FIG. 1 is a schematic illustration of a wireless communication system.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104 and user equipments (UEs) 106 and 107. By virtue of the wireless communication system 100, the UE 106 may be enabled to carry out data communication with an external data network 110, such as (but not limited to) the Internet. In some examples, the RAN 104 may correspond to a Wireless Wide Area Network (WWAN).

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
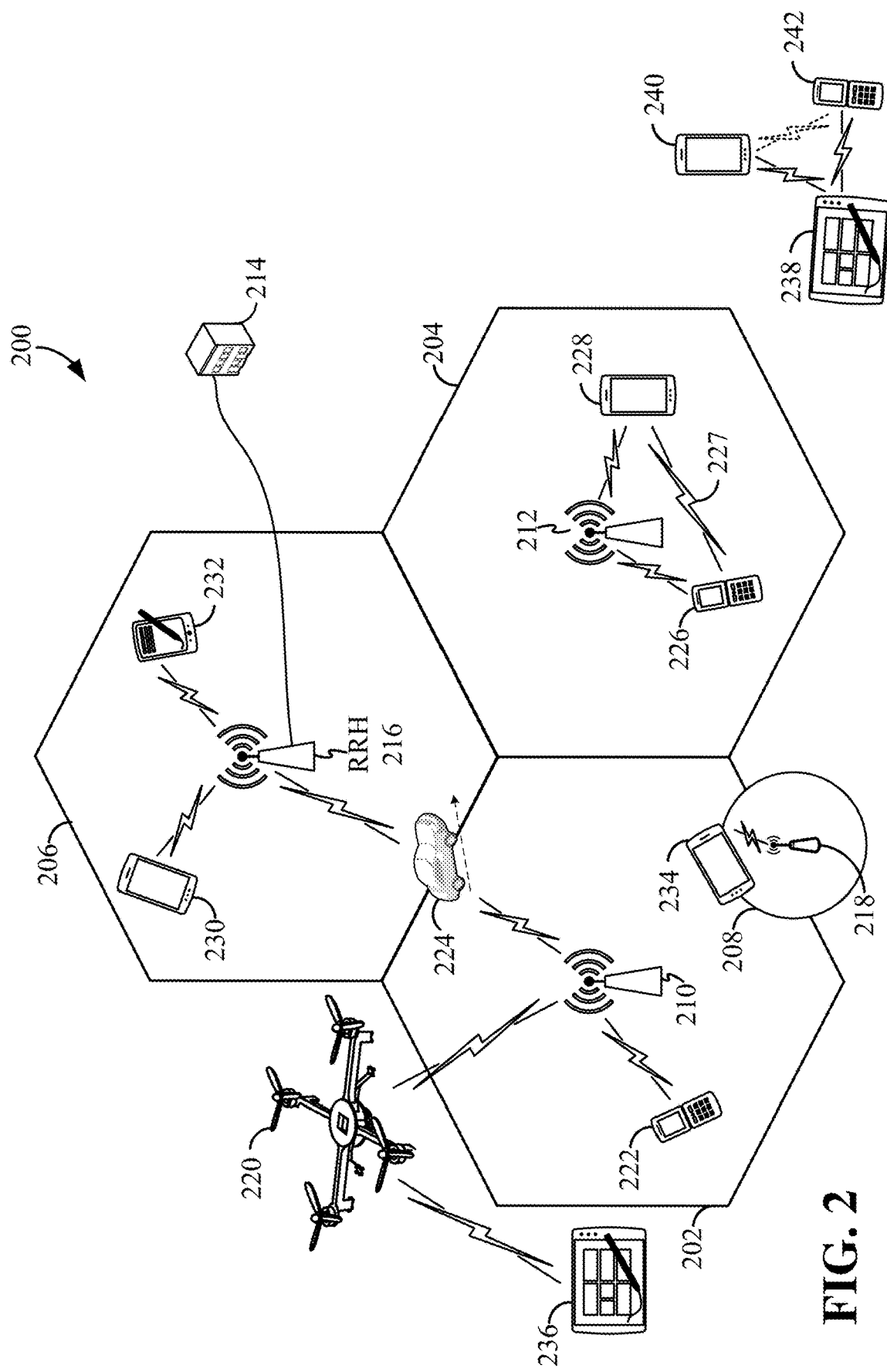
FIG. 2 is a conceptual illustration of an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network (e.g., a C-V2X network), and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access. Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

Figure 3:
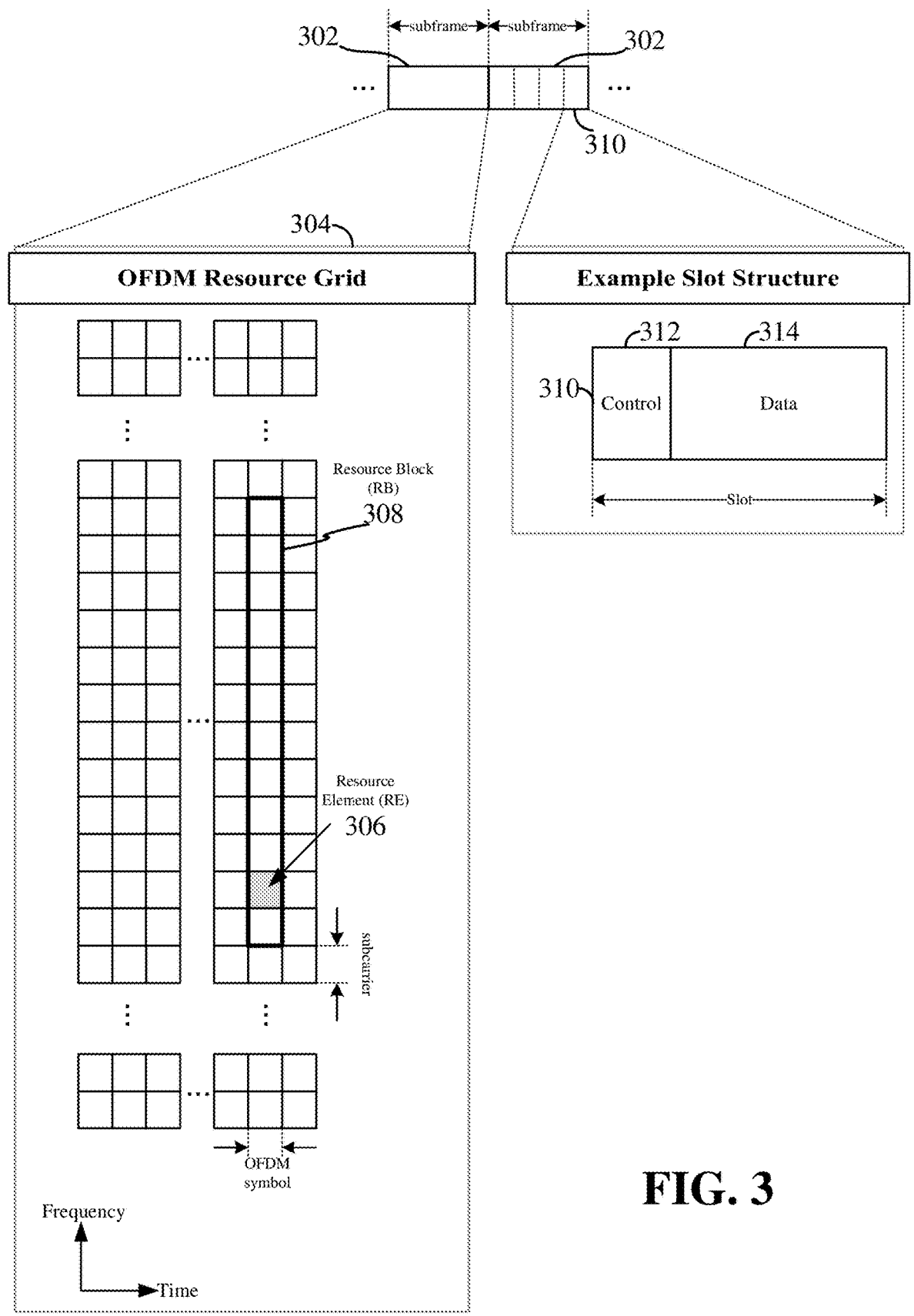
FIG. 3 is a schematic illustration of an organization of wireless resources in an air interface utilizing orthogonal frequency divisional multiplexing (OFDM).

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In a UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), e.g., a request for the scheduling entity 108 to schedule uplink transmissions. Here, in response to the SR transmitted on the control channel 118, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

In addition, within a sidelink network, such as a C-V2X network, the control region 312 of the slot 310 may include sidelink control information transmitted by a transmitting sidelink device towards a set of one or more receiving sidelink devices nearby the transmitting sidelink device. In some examples, the sidelink control information may include synchronization information to synchronize communication by a plurality of sidelink devices on the sidelink channel. In addition, the sidelink control information may include scheduling information indicating one or more resource blocks within the data region 314 of the slot 310 reserved by the transmitting sidelink device to transmit sidelink data to the set of one or more receiving sidelink devices. For example, the control region 312 of the slot 310 may include the scheduling information, while the data region 314 of the slot 310 may include sidelink data transmitted in accordance with the scheduling information. The scheduling information may further relate to an expected subsequent transmission in a later slot and/or to a transmission spanning multiple slots. For example, the sidelink device may reserve resource blocks across multiple slots for a large transmission. By reserving resources for a subsequent transmission, another nearby sidelink device may refrain from using the same (or overlapping) resources to avoid interfering with the expected transmission. In some examples, the scheduling information may further include information related to the data, such as a modulation and coding scheme utilized for the data. In some examples, the control information may be transmitted within a physical sidelink control channel (PSCCH), while the data may be transmitted within a physical sidelink shared channel (PSSCH).

Two primary technologies that may be used by V2X networks include dedicated short range communication (DSRC) based on IEEE 802.11p standards and cellular V2X based on LTE and/or 5G (New Radio) standards. C-V2X is designed to be compatible with both 4G LTE and emerging New Radio (NR) technologies, enabling C-V2X devices to support both C-V2X connections and LTE and/or NR connections. Various aspects of the present disclosure may relate to New Radio (NR) cellular V2X networks. However, it should be understood that the concepts disclosed herein may not be limited to a particular V2X standard.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Figure 4:
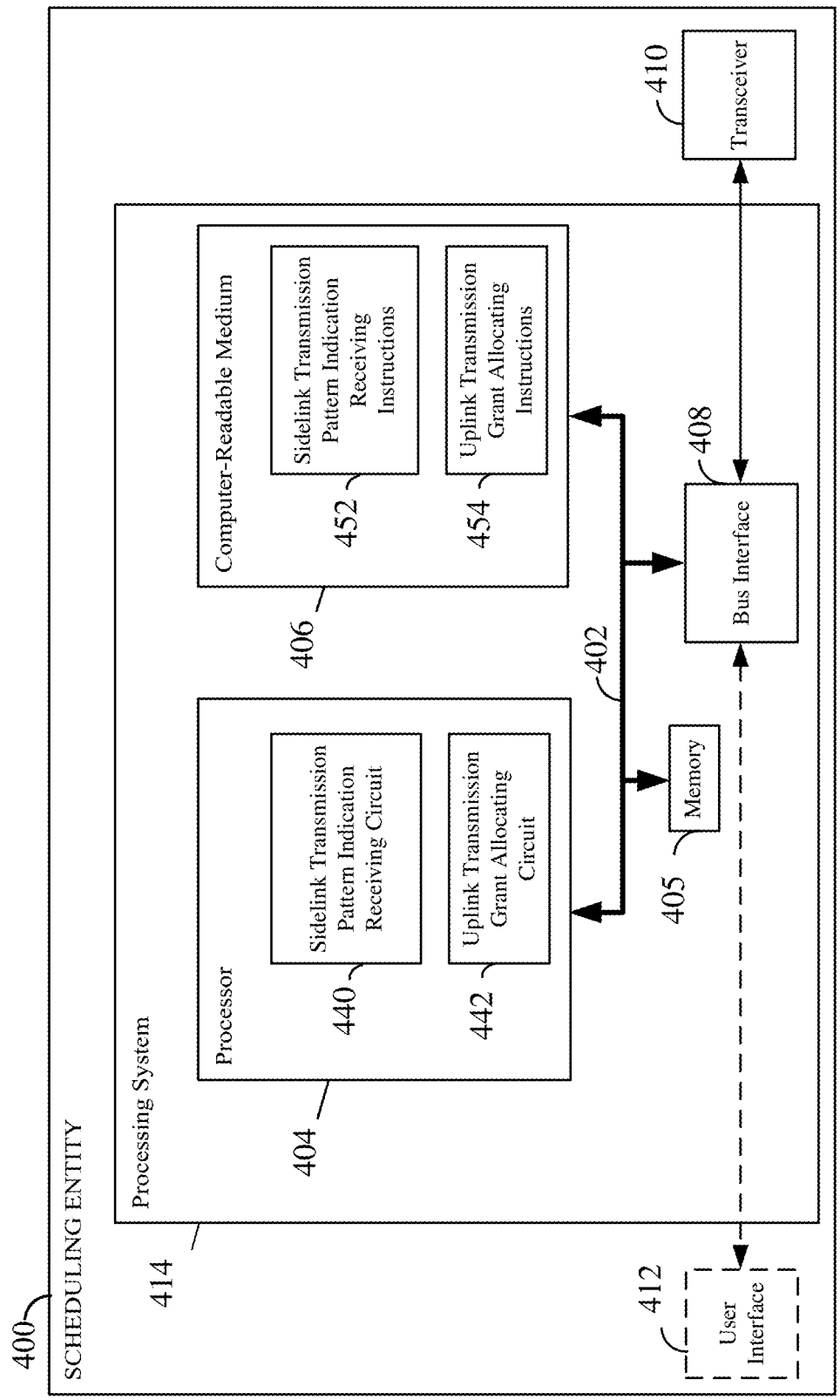
FIG. 4 is a block diagram conceptually illustrating an example of a hardware implementation for a scheduling entity according to some aspects of the disclosure.

FIG. 4 is a block diagram illustrating an example of a hardware implementation for a scheduling entity 400 employing a processing system 414. For example, the scheduling entity 400 may be a base station as illustrated in any one or more of FIGS. 1 and/or 2. The scheduling entity 400 may be configured for communication within a Wireless Wide Area Network (WWAN), such as the RAN illustrated in FIGS. 1 and/or 2.

The scheduling entity 400 may be implemented with a processing system 414 that includes one or more processors 404. Examples of processors 404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 400 may be configured to perform any one or more of the functions described herein. That is, the processor 404, as utilized in a scheduling entity 400, may be used to implement any one or more of the processes and procedures described below and illustrated in FIG. 11.

In this example, the processing system 414 may be implemented with a bus architecture, represented generally by the bus 402. The bus 402 may include any number of interconnecting buses and bridges depending on the specific application of the processing system 414 and the overall design constraints. The bus 402 communicatively couples together various circuits including one or more processors (represented generally by the processor 404), a memory 405, and computer-readable media (represented generally by the computer-readable medium 406). The bus 402 may also link various other circuits such as timing sources, peripherals, voltage regulators, and power management circuits, which are well known in the art, and therefore, will not be described any further. A bus interface 408 provides an interface between the bus 402 and a transceiver 410. The transceiver 410 provides a communication interface or means for communicating with various other apparatus over a transmission medium. Depending upon the nature of the apparatus, a user interface 412 (e.g., keypad, display, speaker, microphone, joystick) may also be provided. Of course, such a user interface 412 is optional, and may be omitted in some examples, such as a base station.

In some aspects of the disclosure, the processor 404 may include circuitry configured for various functions. For example, the processor 404 may include sidelink transmission pattern indication receiving circuitry 440 configured for various functions, including, for example, receiving a sidelink transmission configuration from a user equipment, the sidelink transmission configuration including one or more sidelink transmission patterns and/or receiving an indication of a sidelink transmission pattern. For example, the sidelink transmission pattern indication receiving circuitry 440 may be configured to implement one or more of the functions described below in relation to FIG. 11, including, e.g., blocks 1102 and/or 1104.

In some aspects of the disclosure, the processor 404 may include uplink transmission grant allocating circuitry 442 configured for various functions, including, for example, allocating one or more uplink transmission grants for a wireless wide area network (WWAN) to the user equipment based on at least the sidelink transmission pattern. For example, the uplink transmission grant allocating circuitry 442 may be configured to implement one or more of the functions described below in relation to FIG. 11, including, e.g., block 1106.

The processor 404 is responsible for managing the bus 402 and general processing, including the execution of software stored on the computer-readable medium 406. The software, when executed by the processor 404, causes the processing system 414 to perform the various functions described below for any particular apparatus. The computer-readable medium 406 and the memory 405 may also be used for storing data that is manipulated by the processor 404 when executing software.

One or more processors 404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 406. The computer-readable medium 406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 406 may reside in the processing system 414, external to the processing system 414, or distributed across multiple entities including the processing system 414. The computer-readable medium 406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 406 may include sidelink transmission pattern indication receiving software 452 configured for various functions, including, for example, receiving a sidelink transmission configuration from a user equipment, the sidelink transmission configuration including one or more sidelink transmission patterns and/or receiving an indication of a sidelink transmission pattern. For example, the sidelink transmission pattern indication receiving software 452 may be configured to implement one or more of the functions described below in relation to FIG. 11, including, e.g., blocks 1102 and/or 1104.

In one or more examples, the computer-readable storage medium 406 may include uplink transmission grant allocating software 454 configured for various functions, including, for example, allocating one or more uplink transmission grants for a WWAN to the user equipment based on at least the sidelink transmission pattern. For example, the uplink transmission grant allocating software 454 may be configured to implement one or more of the functions described below in relation to FIG. 11, including, e.g., block 1106.

Figure 5:
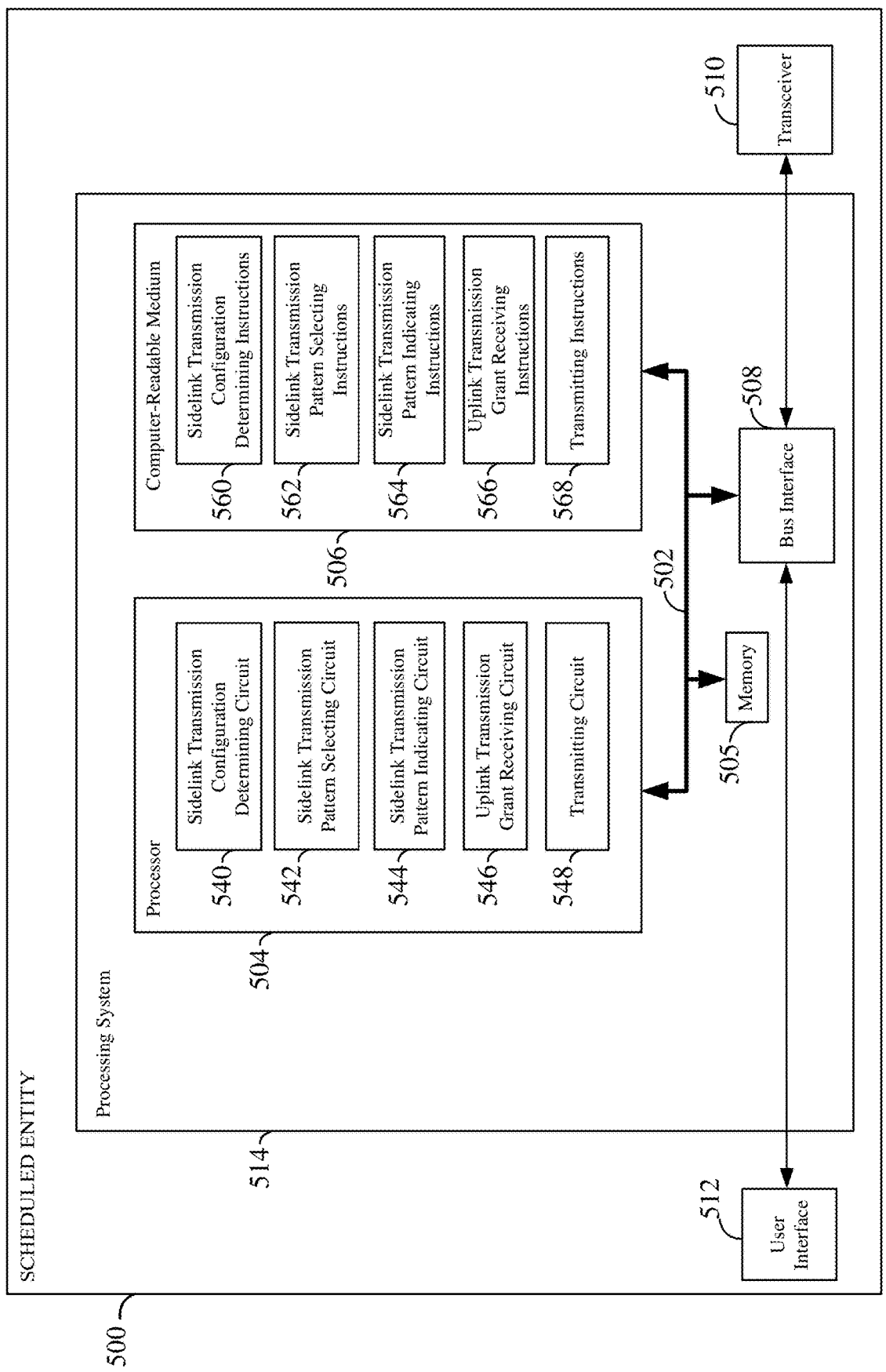
FIG. 5 is a block diagram conceptually illustrating an example of a hardware implementation for a scheduled entity according to some aspects of the disclosure.

FIG. 5 is a conceptual diagram illustrating an example of a hardware implementation for an exemplary scheduled entity 500 employing a processing system 514. In accordance with various aspects of the disclosure, an element, or any portion of an element, or any combination of elements may be implemented with a processing system 514 that includes one or more processors 504. For example, the scheduled entity 500 may be a user equipment (UE) as illustrated in any one or more of FIGS. 1 and/or 2. In some implementations, the scheduled entity 500 may be a vehicle configured for communication in a C-V2X network and a WWAN network.

The processing system 514 may be substantially the same as the processing system 414 illustrated in FIG. 4, including a bus interface 508, a bus 502, memory 505, a processor 504, and a computer-readable medium 506. Furthermore, the scheduled entity 500 may include a user interface 512 and a transceiver 510 substantially similar to those described above in FIG. 4. That is, the processor 504, as utilized in a scheduled entity 500, may be used to implement any one or more of the processes described below and illustrated in FIG. 10.

In some aspects of the disclosure, the processor 504 may include sidelink transmission configuration determining circuitry 540 configured for various functions, including, for example, determining a sidelink transmission configuration based on available sidelink transmission resources. For example, the sidelink transmission configuration determining circuitry 540 may be configured to implement one or more of the functions described below in relation to FIG. 10, including, e.g., block 1002.

In some aspects of the disclosure, the processor 504 may include sidelink transmission pattern selecting circuitry 542 configured for various functions, including, for example, selecting a sidelink transmission pattern from among one or more sidelink transmission patterns based on expected sidelink transmissions. For example, the sidelink transmission pattern selecting circuitry 542 may be configured to implement one or more of the functions described below in relation to FIG. 10, including, e.g., block 1006.

In some aspects of the disclosure, the processor 504 may include sidelink transmission pattern indicating circuitry 544 configured for various functions, including, for example, indicating a sidelink transmission pattern to a WWAN. For example, the sidelink transmission pattern indicating circuitry 544 may be configured to implement one or more of the functions described below in relation to FIG. 10, including, e.g., blocks 1008.

In some aspects of the disclosure, the processor 504 may include uplink transmission grant receiving circuitry 546 configured for various functions, including, for example, receiving one or more uplink transmission grants for the WWAN based on at least the sidelink transmission pattern. For example, the uplink transmission grant receiving circuitry 546 may be configured to implement one or more of the functions described below in relation to FIG. 10, including, e.g., block 1012.

In some aspects of the disclosure, the processor 504 may include transmitting circuitry 548 configured for various functions, including, for example, transmitting a sidelink transmission configuration to the WWAN, the sidelink transmission configuration including one or more sidelink transmission patterns, transmitting a report to the WWAN indicating a number of uplink transmission grants that were not used within a time period due to a prioritization of one or more sidelink transmissions, where the one or more uplink transmission grants for the WWAN are further based on the report, and/or transmitting at least one of first data to a user equipment on a sidelink channel based on the sidelink transmission pattern or second data to the WWAN based on the one or more uplink transmission grants. For example, the transmitting circuitry 548 may be configured to implement one or more of the functions described below in relation to FIG. 10, including, e.g., blocks 1004, 1010, 1014.

In one or more examples, the computer-readable storage medium 506 may include sidelink transmission configuration determining software 560 configured for various functions, including, for example, determining a sidelink transmission configuration based on available sidelink transmission resources. For example, the sidelink transmission configuration determining software 560 may be configured to implement one or more of the functions described herein in relation to FIG. 10, including, e.g., block 1002.

In some aspects of the disclosure, the computer-readable storage medium 506 may include sidelink transmission pattern selecting software 562 configured for various functions, including, for example, selecting the sidelink transmission pattern from among the one or more sidelink transmission patterns based on expected sidelink transmissions. For example, the sidelink transmission pattern selecting software 562 may be configured to implement one or more of the functions described herein in relation to FIG. 10, including, e.g., block 1006.

In some aspects of the disclosure, the computer-readable storage medium 506 may include sidelink transmission pattern indicating software 564 configured for various functions, including, for example, indicating a sidelink transmission pattern to a WWAN. For example, the sidelink transmission pattern indicating software 564 may be configured to implement one or more of the functions described herein in relation to FIG. 10, including, e.g., block 1008.

In some aspects of the disclosure, the computer-readable storage medium 506 may include uplink transmission grant receiving software 566 configured for various functions, including, for example, receiving one or more uplink transmission grants for the WWAN based on at least the sidelink transmission pattern. For example, the uplink transmission grant receiving software 566 may be configured to implement one or more of the functions described herein in relation to FIG. 10, including, e.g., block 1012.

In some aspects of the disclosure, the computer-readable storage medium 506 may include transmitting software 568 configured for various functions, including, for example, transmitting a sidelink transmission configuration to the WWAN, the sidelink transmission configuration including one or more sidelink transmission patterns, transmitting a report to the WWAN indicating a number of uplink transmission grants that were not used within a time period due to a prioritization of one or more sidelink transmissions, where the one or more uplink transmission grants for the WWAN are further based on the report, and/or transmitting at least one of first data to a user equipment on a sidelink channel based on the sidelink transmission pattern or second data to the WWAN based on the one or more uplink transmission grants. For example, the transmitting software 568 may be configured to implement one or more of the functions described herein in relation to FIG. 10, including, e.g., blocks 1004, 1010, 1014.

Figure 6:
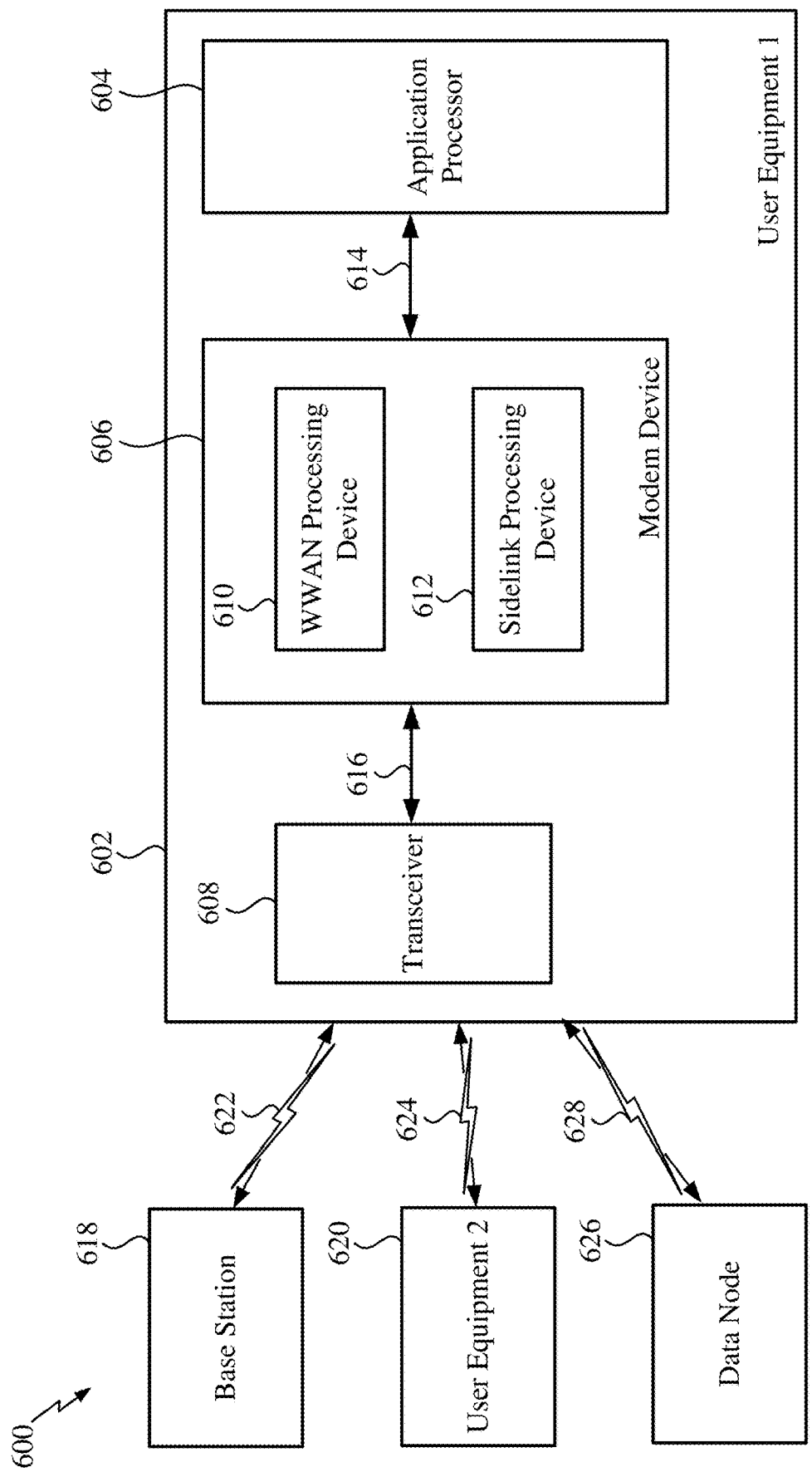
FIG. 6 illustrates an exemplary network according to some aspects of the disclosure.

FIG. 6 illustrates an exemplary network 600 in accordance with various aspects of the disclosure. As shown in FIG. 6, the network 600 includes a first user equipment (UE) 602 (also referred to as a scheduled entity), a base station 618 (also referred to as a scheduling entity), and a second user equipment (UE) 620. In some aspects of the disclosure, the first UE 602 may include an application processor 604, a modem device 606, and a transceiver 608. The modem device 606 may include a WWAN processing device 610 and a sidelink processing device 612. In some examples, the sidelink processing device 612 may be a Cellular Vehicle-to-Everything (C-V2X) processing device. In some aspects of the disclosure, the transceiver 608 may be configured to support WWAN communications (e.g., transmit/receive signals using cellular communication protocols such as Long-Term Evolution (LTE), 5G, etc.) and to support sidelink communications (e.g., transmit/receive signals using direct communication protocols, such as C-V2X). For example, the sidelink communications may be transmitted/received using the Intelligent Transport System (ITS) 5.9 GHz band (e.g., the 3GPP defined band 47).

As shown in FIG. 6, the first UE 602 may communicate with the base station 618 over the WWAN link 622, the second UE 620 over the sidelink 624, and/or the data node 626 over the sidelink 628. In some aspects of the disclosure, the first UE 602 may be a first vehicle, the second UE 620 may be a second vehicle, and the data node 626 may be a roadside unit (RSU). For example, the RSU may be installed near a road, highway, etc. and may include a transceiver capable of receiving and/or transmitting sidelink communications. In some aspects of the disclosure, the first UE 602 may transmit data (e.g., time, vehicle speed, vehicle location) to the RSU through one or more sidelink communications. In some aspects of the disclosure, the first UE 602 may obtain traffic information from the RSU through one or more sidelink communications.

In one example scenario, the application processor 604 may need to transmit a data payload to the base station 618. The application processor 604 may provide the first data payload to the modem device 606 via the data path 614, and the WWAN processing device 610 may process the data payload for transmission to the base station 618. The WWAN processing device 610 may provide the data payload to the transceiver 608 via the data path 616 for transmission to the base station 618 over the WWAN link 622. In another example scenario, the application processor 604 may need to send a second data payload to the second UE 620. The application processor 604 may provide the second data payload to the modem device 606 via the data path 614, and the sidelink processing device 612 may process the second data payload for transmission to the second UE 620. The sidelink processing device 612 may provide the second data payload to the transceiver 608 via the data path 616 for transmission to the second UE 620 over the sidelink 624. In yet another example scenario, the application processor 604 may need to send a third data payload to the data node 626. The application processor 604 may provide the third data payload to the modem device 606 via the data path 614, and the sidelink processing device 612 may process the third data payload for transmission to the data node 626. The sidelink processing device 612 may provide the third data payload to the transceiver 608 via the data path 616 for transmission to the data node 626 over the sidelink 628.

In some aspects of the disclosure, since the modem device 606 is configured to process both WWAN communications (e.g., LTE, 5G, etc.) and sidelink communications (e.g., C-V2X), WWAN transmissions and sidelink transmissions may need to share resources, such as time-frequency resources. In one example, the first UE 602 may be able to perform either a WWAN transmission to the base station 618 or a sidelink transmission to the second UE 620 in a given subframe, but may not be able to perform both transmissions in a given subframe. In another example, the first UE 602 may be able to perform a sidelink transmission to the second UE 620 and a WWAN transmission to the base station 618 in a given subframe, however such concurrent sidelink and WWAN transmissions in a subframe may reduce the power headroom. For example, the first UE 602 may concurrently transmit a WWAN transmission and a C-V2X transmission in a subframe, however the WWAN transmission may need to be transmitted using lower transmission power levels. Therefore, the first UE 602 may perform transmission power sharing in some scenarios to successfully transmit both a C-V2X transmission and a WWAN transmission in the same subframe. In some aspects of the disclosure, if the first UE 602 needs to transmit a sidelink transmission to the second UE 620 in a subframe, the first UE 602 may need to skip a WWAN transmission to the base station 618 in that subframe.

In some aspects of the disclosure, the first UE 602 may be operating in a first mode (e.g., 3GPP defined Mode 3) where time-frequency resources for WWAN and sidelink transmissions are dynamically allocated to the first UE 602 by the WWAN (e.g., the base station 618). In other aspects, the first UE 602 may be operating in a second mode (e.g., 3GPP defined Mode 4) where time-frequency resources for sidelink transmission are allocated to the first UE 602 ahead of time. In such aspects, for example, the time-frequency resources for sidelink transmissions may be stored at the first UE 602 and autonomously selected by the first UE 602 (e.g., without network intervention). In some aspects of the disclosure, the resources stored at the first UE 602 for autonomous selection and use may be referred to as available sidelink transmission resources or pre-allocated sidelink transmission resources. In some aspects of the disclosure, such time-frequency resources for sidelink transmissions stored at the first UE 602 may include one or more resource pools. For example, a resource pool may be a set of resources assigned to the sidelink operation and may include subframes (e.g., one or more subframe numbers with respect to a transmission frame), time slots, resource blocks within the subframes, frequencies, and any other information that may identify resources for sidelink communications.

In some aspects of the disclosure, the time-frequency resources for sidelink transmissions that may be stored at the first UE 602 and autonomously selected by the first UE 602 for transmissions in a WWAN may be obtained from a different network. For example, the first UE 602 may include a first subscriber identity module (SIM) card providing access to a C-V2X network and may include a second SIM card providing access to a WWAN. In this example, the first UE 602 may operate in 3GPP defined Mode 3 and may dynamically obtain the time-frequency resources for sidelink transmissions from the C-V2X network. The first UE 602 may then indicate the obtained time-frequency resources to the WWAN.

Figure 7:
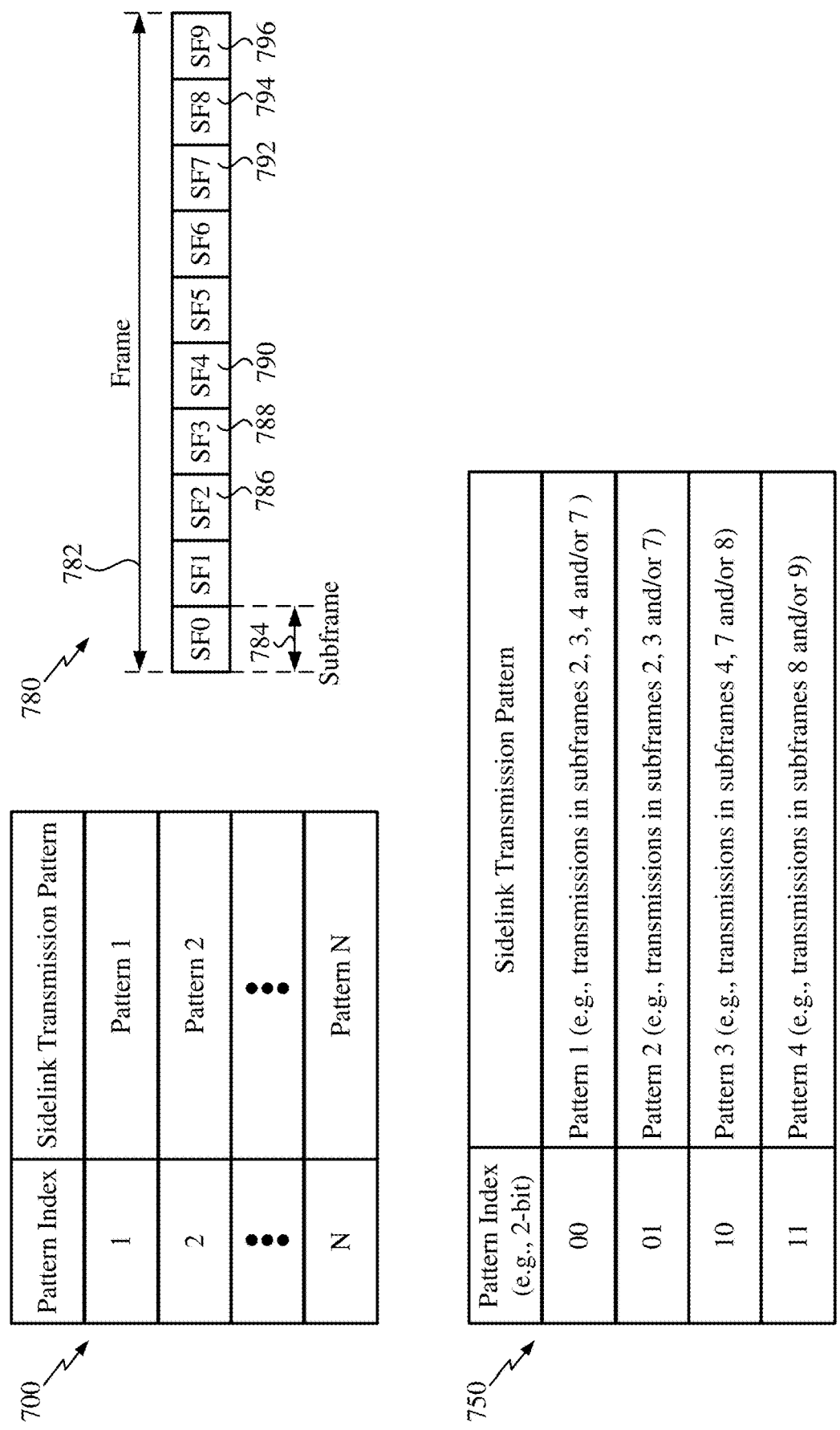
FIG. 7 illustrates exemplary transmission patterns and their corresponding index values according to some aspects of the disclosure.

In one aspect of the disclosure, the first UE 602 may determine a sidelink transmission pattern (also referred to as a sidelink scheduling pattern or scheduling pattern). For example, the sidelink transmission pattern may be one of a set of predefined (e.g., preconfigured) transmission patterns stored at the first UE 602. In another example, the sidelink transmission pattern may be one of a set of transmission patterns dynamically configured by the WWAN (e.g., the base station 618) and provided to the first UE 602. Each of the transmission patterns may indicate one or more subframes (e.g., within a transmission frame) in which the first UE 602 expects to transmit on the sidelink. In one aspect, and as shown in FIG. 7, the first UE 602 may store a table 700 that includes N possible transmission patterns and their corresponding index values. An example implementation of the table 700 is provided in table 750 of FIG. 7. As shown in FIG. 7, the table 750 includes four possible sidelink transmission patterns (e.g., Pattern 1 to Pattern 4) and their corresponding 2-bit index values. In this example implementation, the Pattern 1 may indicate that the first UE 602 expects to transmit on the sidelink channel in subframes 2, 3, 4 and/or 7 of a transmission frame. For example, with reference to the exemplary transmission frame 780 shown in FIG. 7, Pattern 1 may indicate that the first UE 602 expects to transmit on the sidelink channel in subframe 2 786 (abbreviated as SF2 in FIG. 7), subframe 3 788 (abbreviated as SF3 in FIG. 7), subframe 4 790 (abbreviated as SF4 in FIG. 7), and/or subframe 7 792 (abbreviated as SF7 in FIG. 7). In some aspects of the disclosure, the transmission frame 780 may be a WWAN transmission frame, such as an LTE or 5G transmission frame. For example, the transmission frame 780 may have a duration 782 of 10 ms and each subframe may have a duration 784 of 1 ms. In some examples, a transmission pattern determined by the first UE 602 may be applied to multiple (e.g., consecutive) transmission frames in a persistent or semi-persistent manner Continuing with this example implementation, Pattern 2 may indicate that the first UE 602 expects to transmit on the sidelink in subframes 2, 3, and/or 7 (e.g., subframe 2 786, subframe 3 788, and/or subframe 7 792 in the transmission frame 780), Pattern 3 may indicate that the first UE 602 expects to transmit on the sidelink channel in subframes 4, 7 and/or 8 (e.g., subframe 4 790, subframe 7 792, and/or subframe 8 794 in the transmission frame 780), and Pattern 4 may indicate that the first UE 602 expects to transmit on the sidelink in subframes 8 and 9 (e.g., subframe 8 794 and/or subframe 9 796 in the transmission frame 780).

Figure 8:
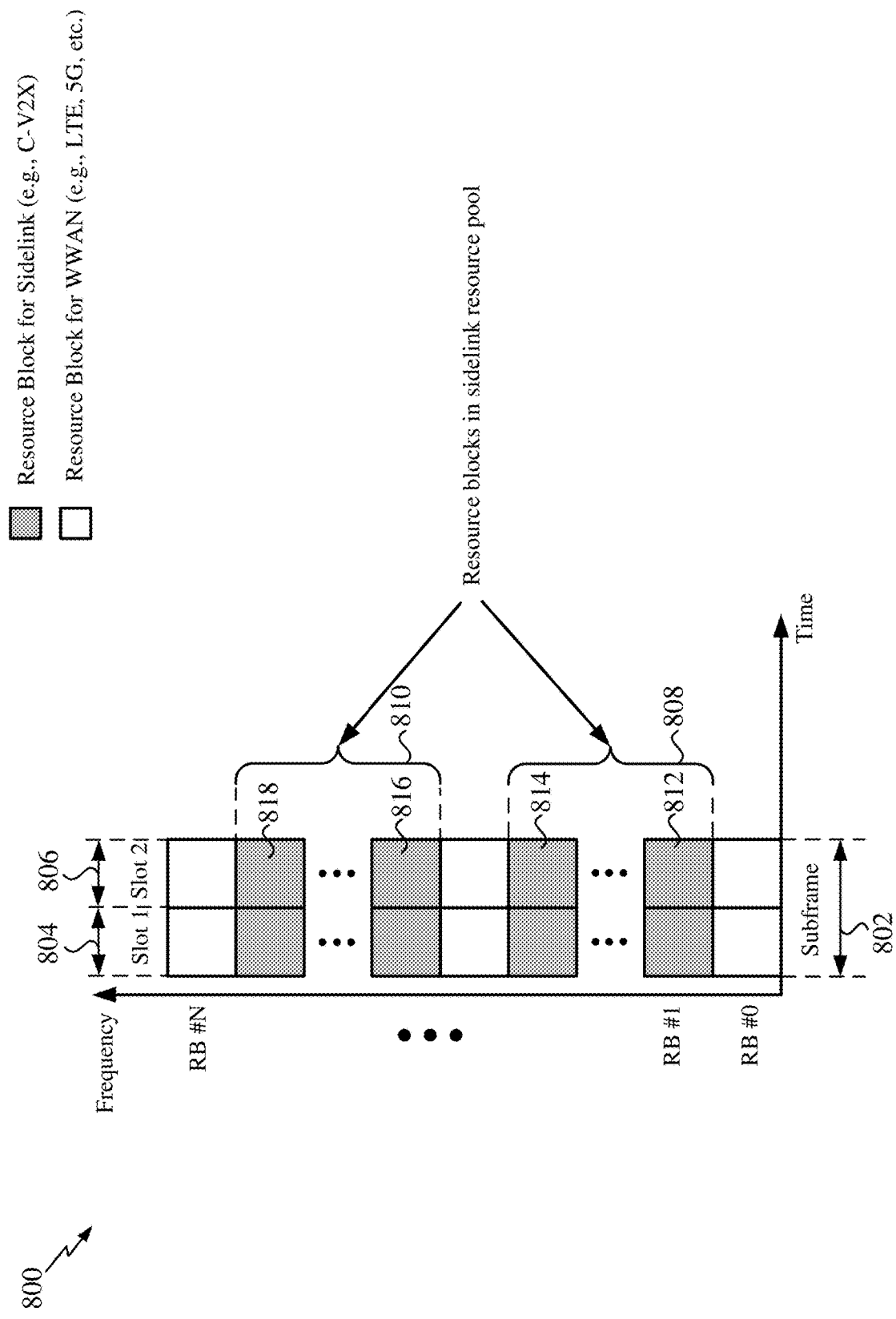
FIG. 8 illustrates an exemplary subframe according to some aspects of the disclosure.

In some aspects of the disclosure, the first UE 602 may further determine the slots and/or resource blocks (RBs) of the subframes in which the first UE 602 expects to transmit on the sidelink. For example, with reference to the exemplary subframe 800 shown in FIG. 8, the first UE 602 may determine the slot(s) (e.g., slot 1 804 and/or slot 2 806) of the subframe 800 in which the first UE 602 expects to transmit on the sidelink channel, and the resource blocks in the slot(s) to be used for the sidelink transmission. For example, the first UE 602 may determine that the resources blocks 812 through 814 and the resource blocks 816 to 818 in slot 2 806 are to be used for sidelink transmissions. In some aspects of the disclosure, the resource blocks in a subframe that the first UE 602 may use for a sidelink transmission may be stored at the first UE 602 as a resource pool.

In some aspects of the disclosure, the first UE 602 may determine a periodicity of one or more sidelink transmissions (e.g., a sidelink transmission every 100 ms, a sidelink transmission every 500 ms, etc.), a power level for one or more sidelink transmissions, a priority of one or more sidelink transmissions (e.g., high, medium, low), an estimated power headroom for one or more sidelink transmissions, and/or services associated with one or more sidelink transmissions. For example, the estimated power headroom may be a single value (e.g., 16 decibel-milliwatts (dBm)) or a range of values (e.g., 16 dBm to 23 dBm). In some aspects of the disclosure, the WWAN (e.g., the base station 618) may configure the transmission power to be used by the first UE 602 for sidelink transmissions (e.g., for transmissions of the previously described second data payload and/or third data payload) and/or WWAN transmissions based on a sidelink transmission pattern indicated by the first UE 602.

In some aspects of the disclosure, each of the previously described transmission patterns may be associated with a priority level. For example, each type of priority level may be mapped to a number (e.g., 1, 2, or 3) or a binary value (e.g., '00', '01', '10'). For example, the binary value '00' may indicate high priority (e.g., the highest priority), the binary value '01' may indicate medium priority, and the binary value '10' may indicate low priority (e.g., the lowest priority). For example, with reference to FIG. 7, Pattern 1 in table 750 may be associated with a high priority level and Pattern 4 in table 750 may be associated with a low priority level. In some aspects of the disclosure, a high priority level may indicate emergency C-V2X transmissions, such as a transmission indicating that a vehicle is braking. In some aspects of the disclosure, the WWAN (e.g., the base station 618) may not cause the first UE 602 to skip sidelink transmissions that have been designated as high priority for purposes of allocating resources for WWAN transmissions in a given subframe. In some aspects of the disclosure, a low priority level may indicate non-emergency C-V2X transmissions, such as a transmission indicating that a vehicle is parking. In some aspects of the disclosure, the WWAN (e.g., the base station 618) may cause the first UE 602 to skip sidelink transmissions that have been designated as low priority for purposes of allocating resources for WWAN transmissions in a given subframe. Therefore, the ability of the WWAN to override low priority sidelink transmissions scheduled in a subframe may provide resource scheduling flexibility to the WWAN in some scenarios.

Figure 9:
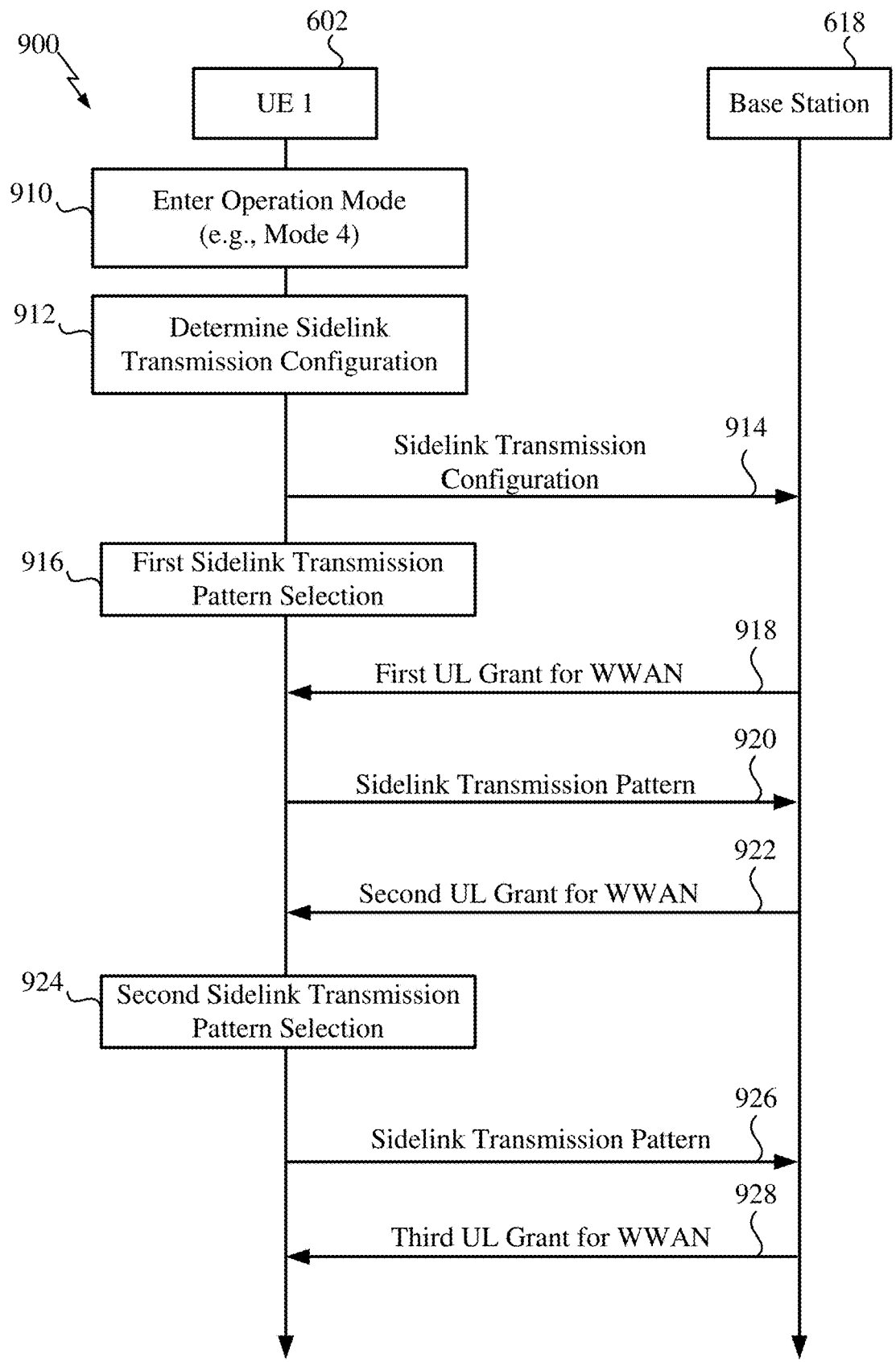
FIG. 9 illustrates an exemplary signal flow diagram according to some aspects of the disclosure.

An exemplary operation of the present disclosure will now be described with reference to the signal flow diagram 900 in FIG. 9. With reference to FIG. 9, at block 910, the first UE 602 may enter (e.g., initiate) an operation mode (e.g., 3GPP defined Mode 4). At block 912, the first UE 602 may determine a sidelink transmission configuration. In one aspect of the disclosure, the sidelink transmission configuration may include one or more possible sidelink transmission patterns (e.g., the transmission patterns 1 through N and their corresponding index values as previously described with reference to FIG. 7) that the first UE 602 may choose from for sidelink transmissions. In other aspects of the disclosure, the sidelink transmission configuration may include the one or more possible sidelink transmission patterns and may further include (e.g., for each sidelink transmission pattern) a set of slots of the subframes in which the first UE 602 expects to transmit on the sidelink, a set of resource blocks of the subframes in which the first UE 602 expects to transmit on the sidelink, a power level for one or more sidelink transmissions, a priority of one or more sidelink transmissions (e.g., a priority associated with each of the one or more sidelink transmission patterns), an estimated power headroom for one or more sidelink transmissions, and/or a service associated with one or more sidelink transmissions. In some aspects of the disclosure, the network may be configured to determine one or more of the previously items of information that may be included in a sidelink transmission configuration based on the indicated service associated with one or more sidelink transmissions. As shown in FIG. 9, the first UE 602 may transmit the sidelink transmission configuration to the base station 618 in the message 914. In one aspect of the disclosure, the message 914 may be a radio resource control (RRC) message.

At block 916, the first UE 602 may select a sidelink transmission pattern (e.g., from among the one or more possible sidelink transmission patterns previously provided to the base station 618 via the message 914). Such selection may be referred to as a first sidelink transmission pattern selection. In one aspect of the disclosure, the first UE 602 may select the sidelink transmission pattern based on the type of environment that the first UE 602 is currently in. For example, if the first UE 602 is located in a large city with busy highways, the first UE 602 may select a sidelink transmission pattern that includes more resources for sidelink transmissions (e.g., C-V2X transmissions), such as Pattern 1 in table 750 of FIG. 7. However, if the first UE 602 is located in a small suburb, the first UE 602 may select a sidelink transmission pattern that includes less resources for sidelink transmissions (e.g., C-V2X transmissions), such as Pattern 4 in table 750 of FIG. 7.

The base station 618 may transmit a first uplink (UL) grant (also referred to as a UL transmission grant) for a WWAN transmission via the message 918. The first UE 602 may use the resources indicated in the first UL grant to transmit the sidelink transmission pattern to the base station 618 via the message 920. In some aspects of the disclosure, the first UE 602 may transmit the sidelink transmission pattern using a medium access control (MAC) control element (CE) of a MAC frame. In some aspects of the disclosure, the MAC CE may include a number of bytes (e.g., 8 bytes) and a first set of bits (e.g., 2 bits) in the MAC CE may be allocated for communication of an index value of a selected sidelink transmission pattern. For example, with reference to the table 750 in FIG. 7, if the first UE 602 selects Pattern 1, the first UE 602 may set the first set of bits in the MAC CE to '00'. As another example, if the first UE 602 selects Pattern 3, the first UE 602 may set the first set of bits in the MAC CE to '10'. It can be appreciated that the use of the MAC CE to communicate the selected sidelink transmission pattern may significantly reduce signaling overhead in cases where the first UE 602 frequently changes sidelink transmission patterns. In some aspects of the disclosure, the MAC CE may further include a second set of bits (e.g., one bit) that may be used by the first UE 602 to indicate whether the first UE 602 is active or inactive. In some aspects of the disclosure, the MAC CE may further include a third set of bits (e.g., one bit) that may be used by the first UE 602 to enable/disable C-V2X communications. In the aspects described herein, there may be a prior agreement between the first UE 602 and the base station 618 as to the allocation and meaning of the bit values in the previously described MAC CE.

Therefore, by providing the selected sidelink transmission pattern to the base station 618, the base station 618 will know when (e.g., in which subframes) the first UE 602 expects to transmit on the sidelink channel. Since the first UE 602 may not be able to transmit both sidelink transmissions and WWAN transmissions in a given subframe (or may have limited WWAN transmission capability in a subframe that includes a sidelink transmission), the base station 618 may consider the selected sidelink transmission pattern when allocating UL grants for WWAN transmissions to the first UE 602. For example, the base station 618 may avoid allocating UL grants for WWAN transmissions in subframes where the first UE 602 expects to transmit sidelink signals. By avoiding the allocation of such UL grants to the first UE 602 for WWAN transmissions, the network may allocate the UL grants to other UEs that are likely to use the UL grants thereby improving network capacity. In some aspects of the disclosure, the base station 618 may allocate a smaller UL grant for WWAN transmissions (e.g., instead of a larger UL grant) for subframes that coincide with the subframes in which the first UE 602 expects to transmit on the sidelink channel.

As shown in FIG. 9, the base station 618 may transmit a second UL grant for a WWAN transmission via the message 922. In some aspects of the disclosure, the second UL grant for a WWAN transmission may exclude one or more subframes that may be used by the first UE 602 for sidelink transmissions based on the sidelink transmission pattern of message 920. In some examples, the second UL grant for a WWAN transmission may include a reduced amount of resources in one or more subframes that may be used by the first UE 602 for sidelink transmissions. For example, the base station 618 may have knowledge of the one or more subframes that may be used by the first UE 602 for sidelink transmissions from the sidelink transmission pattern of message 920.

At block 924, the first UE 602 may select a different transmission pattern for sidelink transmissions (e.g., from among the one or more possible sidelink transmission patterns previously provided to the base station 618 via the message 914). Such selection may be referred to as a second sidelink transmission pattern selection. In one aspect of the disclosure, the first UE 602 may select the different transmission pattern based on a change in the current environment of the first UE 602 or based on a change in the resource needs of the first UE 602. For example, if the first UE 602 had previously selected Pattern 1 described herein with reference to the table 750 in FIG. 1, and the first UE 602 has moved to a suburb and now requires fewer resources for C-V2X transmissions, the first UE 602 may select Pattern 4 described herein with reference to the table 750 in FIG. 1. The first UE 602 may use the resources indicated in the second UL grant for a WWAN transmission to transmit the different sidelink transmission pattern (e.g., Pattern 4 in the table 750) to the base station 618 via the message 926. In some aspects of the disclosure, the first UE 602 may transmit the different sidelink transmission pattern using a medium access MAC CE of a MAC frame as previously discussed. For example, the first UE 602 may include the index value '11' corresponding to Pattern 4 in the MAC CE. The base station 618 may transmit a third UL grant for a WWAN transmission via the message 928. In some aspects of the disclosure, the third UL grant for a WWAN transmission may exclude one or more subframes that may be used by the first UE 602 for sidelink transmissions based on the sidelink transmission pattern of message 926. In some aspects of the disclosure, the third UL grant for a WWAN transmission may include a reduced amount of resources in one or more subframes that may be used by the first UE 602 for sidelink transmissions. For example, the base station 618 may have knowledge of the one or more subframes that may be used by the first UE 602 for sidelink transmissions from the sidelink transmission pattern of message 926.

In some aspects of the disclosure, if a sidelink transmission to be performed in a given subframe is a C-V2X transmission that is intended to carry messages associated with vehicular warnings and/or safety, the first UE 602 may not skip the C-V2X transmission in that subframe. Moreover, because the modem device 606 is configured to process both WWAN communications (e.g., LTE, 5G, etc.) and sidelink communications (e.g., C-V2X) as previously described (e.g., which may require the sharing of time-frequency resources available in each subframe), there may not be enough resources available in a subframe carrying a C-V2X transmission to adequately carry a WWAN transmission. Therefore, in some aspects of the disclosure, WWAN transmissions may need to be skipped in subframes carrying C-V2X transmissions. In other aspects of the disclosure, the first UE 602 may concurrently transmit WWAN transmissions and C-V2X transmissions in a subframe, but the WWAN transmissions may need to be transmitted using lower transmission power levels. Therefore, the first UE 602 may perform transmission power sharing in some scenarios to successfully transmit both a C-V2X transmission and a WWAN transmission in the same subframe.

In some aspects of the disclosure, the first UE 602 may transmit a transmission interrupt indicator to the base station 618. For example, if the first UE 602 needs to transmit an immediate C-V2X transmission (e.g., an urgent message to communicate an emergency, such as an unavoidable crash of the vehicle) that does not comply with a sidelink transmission pattern provided to the base station 618, the first UE 602 may transmit a transmission interrupt indicator to the base station 618 using a UL grant from the base station. Therefore, in some examples, the transmission interrupt indicator may indicate to the base station 618 that the first UE 602 may be transmitting unexpected sidelink transmissions in a number of upcoming subframes (e.g., three consecutive subframes) and that such sidelink transmissions may not correspond to any sidelink transmission patterns. In some aspects of the disclosure, the transmission interrupt indicator may be implemented as a single bit in the MAC CE and toggled on and off by the first UE 602 as needed. In other aspects of the disclosure, the transmission interrupt indicator may be communicated using multiple bits in the MAC CE.

In some aspects of the disclosure, a sidelink transmission pattern provided to the base station 618 from the first UE 602 may be associated with a certain channel (e.g., a sidelink channel or a PC5 carrier in case of PC5 carrier aggregation). In these aspects, the first UE 602 may indicate the channel associated with a sidelink transmission pattern to the base station 618. In some aspects of the disclosure, the first UE 602 may have access to multiple sidelink channels and each of the multiple sidelink channels may correspond to a different set of sidelink transmission patterns. For example, if the first UE 602 is configured to have access to two sidelink channels, a first set of sidelink transmission patterns may be associated with a first sidelink channel and a second set of sidelink transmission patterns may be associated with a second sidelink channel. With reference to the table 750 in FIG. 7 for example, sidelink transmission patterns 1 and 2 may be for a first sidelink channel and sidelink transmission patterns 3 and 4 may be for a second sidelink channel. In some aspects of the disclosure, each of the sidelink channels may be configured for a different purpose. For example, the first sidelink channel may be configured to carry C-V2X transmissions between a vehicle and traffic lights, stop signs, and/or other road infrastructure, and the second sidelink channel may be configured to carry C-V2X transmissions between vehicles. It should be understood that more than two sidelink channels may be available to the first UE 602 in other aspects. In some aspects of the disclosure, the first UE 602 may indicate the availability of the multiple sidelink channels and the sidelink transmission patterns associated with the multiple sidelink channels to the base station 618 via the sidelink transmission configuration in the message 914. In such aspects, when the first UE 602 transmits the sidelink transmission pattern to the base station 618 using a medium access control (MAC) control element (CE) of a MAC frame, the base station 618 may know the sidelink channel associated with the selected sidelink transmission pattern.

In some aspects of the disclosure, the first UE 602 may report to the base station 618 the number (or the approximate number) of UL transmission grants for the WWAN that the first UE 602 did not use within a time period due to prioritization of sidelink transmissions (e.g., C-V2X transmissions). The base station 618 may consider the number of UL transmission grants that the first UE 602 did not use when allocating a UL transmission grant to the first UE 602. For example, the base station 618 may reduce (e.g., on average) the size and/or number of UL transmission grants for the WWAN instead of avoiding the allocation of UL transmission grants to the first UE 602 for extended periods of time. In some aspects of the disclosure, the report may be communicated to the base station 618 using one or more bits designated for the report in the previously described MAC CE. For example, if two bits are allocated in the MAC CE for communicating the report to the base station 618, a first value (e.g., the binary value '00') may indicate that at least a first percentage (e.g., 5%) of the total UL transmission grants for the WWAN over a period of time were not used due to prioritization of sidelink transmissions (e.g., C-V2X transmissions), a second value (e.g., the binary value '01') may indicate that at least a second percentage (e.g., 10%) of the total UL transmission grants for the WWAN over a period of time were not used due to prioritization of sidelink transmissions, a third value (e.g., the binary value '10') may indicate that at least a third percentage (e.g., 15%) of the total UL transmission grants for the WWAN over a period of time were not used due to prioritization of sidelink transmissions, etc.

In some aspects of the disclosure, the base station 618 may configure a threshold value and may provide the threshold value to the first UE 602. In such aspects, the first UE 602 may not transmit the previously described report to the base station 618 until the number of UL transmissions missed by the first UE 602 over a specified time period exceeds the threshold value. In some aspects of the disclosure, the specified time period may be configured by the base station 618. In some aspects of the disclosure, the base station 618 may configure different threshold values (e.g., for the number of UL transmissions for the WWAN that were not used by the first UE 602) for different priority levels. In some aspects of the disclosure, the base station 618 may configure different threshold values (e.g., for the number of UL transmission grants for the WWAN that were not used by the first UE 602) for different ProSe Per-Packet Priority (PPPP) values and for WWAN UL in case of UL carrier aggregation (CA). In some aspects of the disclosure, whenever a transmission of a report for unused UL transmission grants is triggered at the first UE 602 as previously described, the first UE 602 may transmit a report for a certain UL carrier or may transmit a report for all UL component carriers (CCs) that are active.

Therefore, by notifying the WWAN (e.g., the base station 618) as to the scheduling pattern of sidelink transmissions from a user equipment (e.g., the first UE 602), the aspects described herein may enhance the throughput performance of the WWAN. Moreover, the aspects described herein may enhance the power headroom profile at the user equipment by reducing the occurrence of situations where power headroom at the user equipment is limited due to dual transmissions (e.g., WWAN and sidelink transmissions) in a subframe. Furthermore, the aspects described herein may prevent wasting of UL resources for WWAN transmissions, thereby preserving WWAN network capacity.

Figure 10:
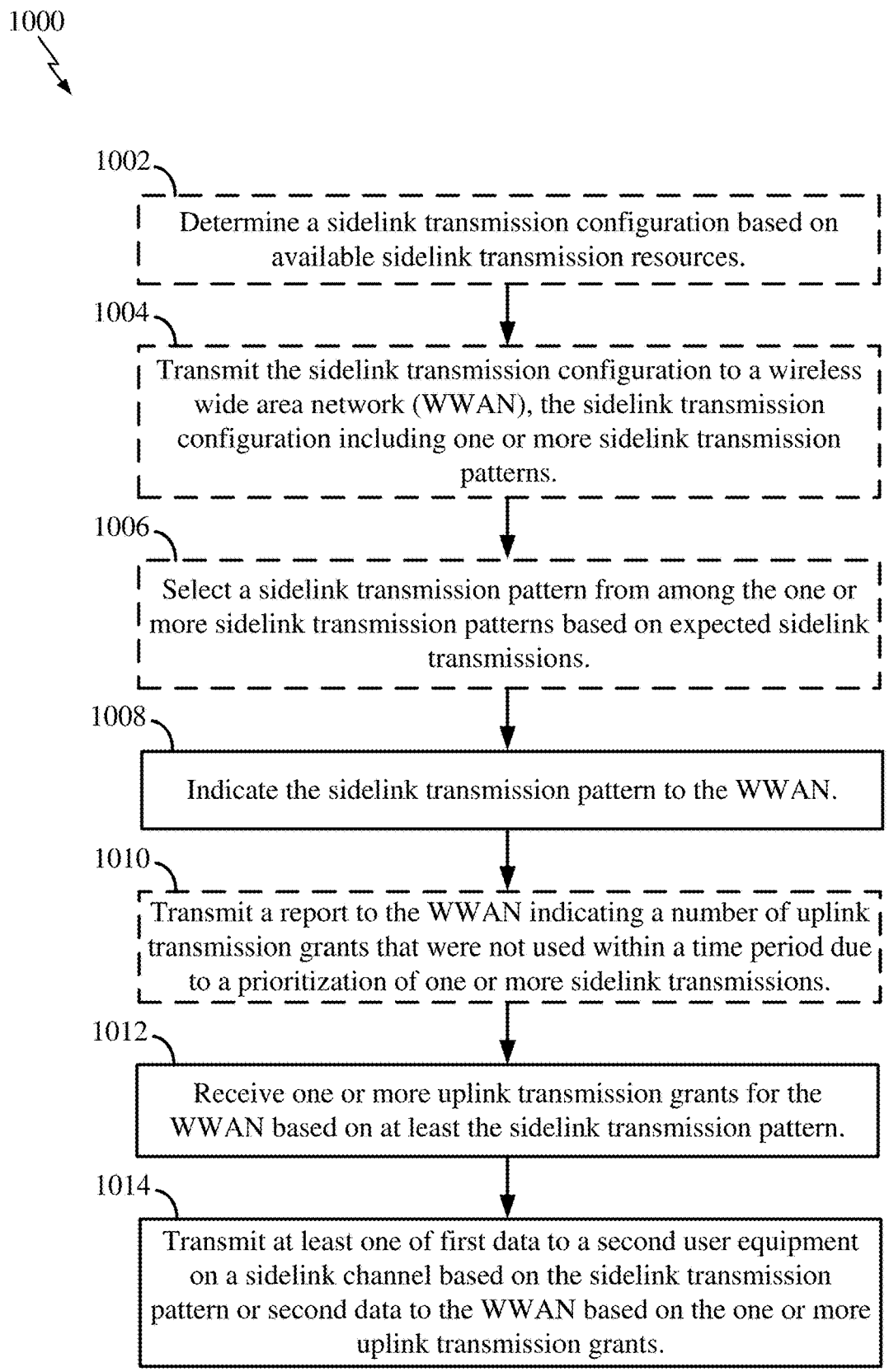
FIG. 10 is a flow chart illustrating an exemplary process according to some aspects of the disclosure.

FIG. 10 is a flow chart illustrating an exemplary process 1000 in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by a user equipment (e.g., the scheduled entity 500 illustrated in FIG. 5 or the first UE 602). In some examples, the process 1000 may be carried out by any suitable apparatus or means for carrying out the functions or algorithm described below. It should be understood that the operations indicated with dashed lines represent optional operations.

At block 1002, the UE (e.g., the first UE 602) determines a sidelink transmission configuration based on available sidelink transmission resources. At block 1004, the UE transmits the sidelink transmission configuration to a WWAN. In some examples, the sidelink transmission configuration includes one or more sidelink transmission patterns. In some aspects of the disclosure, the sidelink transmission configuration may further include at least one of an indication of a set of slots in one or more subframes, an indication of a set of resource blocks in the one or more subframes, a priority associated with each of the one or more sidelink transmission patterns, a sidelink channel associated with each of the one or more sidelink transmission patterns, a power level for one or more sidelink transmissions, an estimated power headroom for the one or more sidelink transmissions, a periodicity of the one or more sidelink transmissions, a service associated with the one or more sidelink transmissions, and/or combinations thereof. In these aspects, the one or more sidelink transmissions may refer to expected sidelink transmissions that the UE may transit in upcoming subframes. In some aspects of the disclosure, the indication of the sidelink transmission pattern may include the power level for the one or more sidelink transmissions, the estimated power headroom for the one or more sidelink transmissions, and/or the service associated with the one or more sidelink transmissions.

At block 1006, the UE selects the sidelink transmission pattern from among the one or more sidelink transmission patterns based on expected sidelink transmissions. At block 1008, the UE indicates a sidelink transmission pattern to the WWAN. At block 1010, the UE transmits a report to the WWAN indicating a number of uplink transmission grants that were not used within a time period due to a prioritization of one or more sidelink transmissions. In some aspects of the disclosure, the one or more uplink transmission grants for the WWAN are further based on the report. At block 1012, the UE receives one or more uplink transmission grants for the WWAN based on at least the sidelink transmission pattern. At block 1014, the UE transmits at least one of first data to another UE (e.g., the second UE 620) on a sidelink channel based on the sidelink transmission pattern or second data to the WWAN based on the one or more uplink transmission grants.

Figure 11:
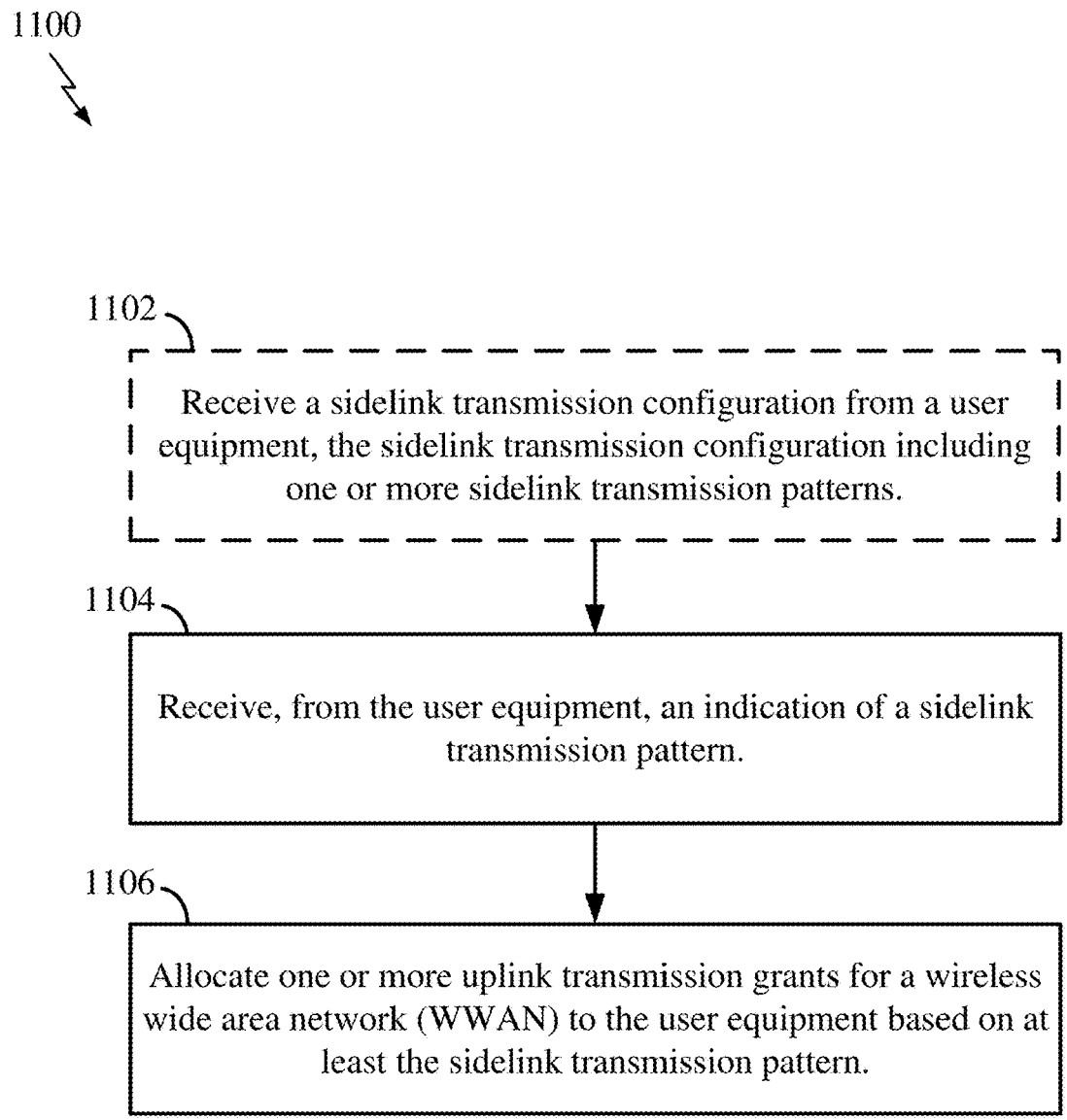
FIG. 11 is a flow chart illustrating an exemplary process according to some aspects of the disclosure.

FIG. 11 is a flow chart illustrating an exemplary process 1100 in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by a base station (e.g., the scheduling entity 400 illustrated in FIG. 4). In some examples, the process 1100 may be carried out by any suitable apparatus or means for carrying out the functions or algorithm described below. It should be understood that the operations indicated with dashed lines represent optional operations.

At block 1102, the base station receives a sidelink transmission configuration from a user equipment, the sidelink transmission configuration including one or more sidelink transmission patterns. At block 1104, the base station receives an indication of a sidelink transmission pattern. At block 1106, the base station allocates one or more uplink transmission grants for a WWAN to the user equipment based on at least the sidelink transmission pattern.

In one configuration, the apparatus 400 for wireless communication includes means for receiving a sidelink transmission configuration from a user equipment, the sidelink transmission configuration including one or more sidelink transmission patterns, means for receiving an indication of a sidelink transmission pattern, and/or means for allocating one or more uplink transmission grants for a WWAN to the user equipment based on at least the sidelink transmission pattern. In one aspect, the aforementioned means may be the processor 404 shown in FIG. 4 configured to perform the functions recited by the aforementioned means. In another example, the aforementioned means may be a circuit or any apparatus configured to perform the functions recited by the aforementioned means.

Of course, in the above examples, the circuitry included in the processor 404 is merely provided as an example, and other means for carrying out the described functions may be included within various aspects of the present disclosure, including but not limited to the instructions stored in the computer-readable storage medium 406, or any other suitable apparatus or means described in any one of the FIGS. 1 and/or 2, and utilizing, for example, the processes and/or algorithms described herein in relation to FIG. 11.

In one configuration, the apparatus 500 for wireless communication includes means for indicating a sidelink transmission pattern to a WWAN, means for receiving one or more uplink transmission grants for the WWAN based on at least the sidelink transmission pattern, means for transmitting at least one of first data to a user equipment on a sidelink channel based on the sidelink transmission pattern or second data to the WWAN based on the one or more uplink transmission grants, means for transmitting a sidelink transmission configuration to the WWAN, the sidelink transmission configuration including one or more sidelink transmission patterns, means for determining the sidelink transmission configuration based on available sidelink transmission resources, means for selecting the sidelink transmission pattern from among the one or more sidelink transmission patterns based on expected sidelink transmissions, and/or means for transmitting a report to the WWAN indicating a number of uplink transmission grants that were not used within a time period due to a prioritization of one or more sidelink transmissions, wherein the one or more uplink transmission grants for the WWAN are further based on the report. In one aspect, the aforementioned means may be the processor 504 shown in FIG. 5 configured to perform the functions recited by the aforementioned means. In another example, the aforementioned means may be a circuit or any apparatus configured to perform the functions recited by the aforementioned means.

Of course, in the above examples, the circuitry included in the processor 504 is merely provided as an example, and other means for carrying out the described functions may be included within various aspects of the present disclosure, including but not limited to the instructions stored in the computer-readable storage medium 506, or any other suitable apparatus or means described in any one of the FIGS. 1 and/or 2, and utilizing, for example, the processes and/or algorithms described herein in relation to FIG. 10.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method for a first user equipment, comprising:
indicating a sidelink transmission pattern to a wireless wide area network (WWAN), wherein the sidelink transmission pattern indicates at least one subframe in which a sidelink transmission is expected;
receiving one or more uplink transmission grants for the WWAN based on at least the sidelink transmission pattern;
transmitting at least one of first data to a second user equipment on a sidelink channel based on the sidelink transmission pattern, or second data to the WWAN based on the one or more uplink transmission grants; and
transmitting a report to the WWAN indicating a number of uplink transmission grants that were not used within a time period due to a prioritization of one or more sidelink transmissions, wherein the report is transmitted when the number of uplink transmission grants that were not used within the time period exceeds a threshold value,
wherein the one or more uplink transmission grants for the WWAN are further based on the report.

2. The method of claim 1, further comprising:
transmitting a sidelink transmission configuration to the WWAN, the sidelink transmission configuration including one or more sidelink transmission patterns.

3. The method of claim 2, further comprising:
determining the sidelink transmission configuration based on available sidelink transmission resources.

4. The method of claim 2, further comprising:
selecting the sidelink transmission pattern from among the one or more sidelink transmission patterns based on expected sidelink transmissions.

5. The method of claim 2, wherein each of the one or more sidelink transmission patterns indicates one or more subframes in which sidelink transmissions are expected.

6. The method of claim 5, wherein the one or more uplink transmission grants for the WWAN excludes the one or more subframes in which the sidelink transmissions are expected.

7. The method of claim 5, wherein the one or more uplink transmission grants for the WWAN includes smaller resource grants in the one or more subframes in which the sidelink transmissions are expected relative to resource grants in subframes excluded from the one or more subframes in which sidelink transmissions are expected.

8. The method of claim 2, wherein the sidelink transmission configuration further includes at least one of an indication of a set of slots in one or more subframes, an indication of a set of resource blocks in the one or more subframes, a priority associated with each of the one or more sidelink transmission patterns, a sidelink channel associated with each of the one or more sidelink transmission patterns, a power level for one or more sidelink transmissions, an estimated power headroom for the one or more sidelink transmissions, a periodicity of the one or more sidelink transmissions, a service associated with the one or more sidelink transmissions, and/or combinations thereof.

9. The method of claim 8, wherein the indication of the sidelink transmission pattern includes at least one of the power level for the one or more sidelink transmissions, the estimated power headroom for the one or more sidelink transmissions, or the service associated with the one or more sidelink transmissions.

10. The method of claim 1, wherein the second user equipment is a vehicle, and the sidelink channel is a Cellular Vehicle-to-Everything (C-V2X) channel.

11. The method of claim 1, wherein the sidelink transmission pattern is preconfigured at the first user equipment or dynamically configured by the WWAN.

12. The method of claim 1, further comprising:
transmitting third data to a data node on the sidelink channel based on the sidelink transmission pattern.

13. The method of claim 12, wherein a transmission power for the transmission of the first data, second data, or third data is configured by the WWAN based on the sidelink transmission pattern.

14. An apparatus for wireless communication, comprising:
a processor;
a transceiver communicatively coupled to the processor; and
a memory communicatively coupled to the processor, wherein the processor is configured to:
indicate a sidelink transmission pattern to a wireless wide area network (WWAN), wherein the sidelink transmission pattern indicates at least one subframe in which a side link transmission is expected,
receive one or more uplink transmission grants for the WWAN based on at least the sidelink transmission pattern,
transmit at least one of first data to a user equipment on a sidelink channel based on the sidelink transmission pattern, or second data to the WWAN based on the one or more uplink transmission grants, and
transmit a report to the WWAN indicating a number of uplink transmission grants that were not used within a time period due to a prioritization of one or more sidelink transmissions, wherein the report is transmitted when the number of uplink transmission grants that were not used within the time period exceeds a threshold value,
wherein the one or more uplink transmission grants for the WWAN are further based on the report.

15. The apparatus of claim 14, wherein the processor is further configured to:
transmit a sidelink transmission configuration to the WWAN, the sidelink transmission configuration including one or more sidelink transmission patterns.

16. The apparatus of claim 15, wherein the processor is further configured to:
determine the sidelink transmission configuration based on available sidelink transmission resources.

17. The apparatus of claim 15, wherein the processor is further configured to:
select the sidelink transmission pattern from among the one or more sidelink transmission patterns based on expected sidelink transmissions.

18. The apparatus of claim 15, wherein each of the one or more sidelink transmission patterns indicates one or more subframes in which sidelink transmissions are expected.

19. The apparatus of claim 18, wherein the one or more uplink transmission grants for the WWAN excludes the one or more subframes in which sidelink transmissions are expected.

20. The apparatus of claim 18, wherein the one or more uplink transmission grants for the WWAN includes smaller resource grants in the one or more subframes in which sidelink transmissions are expected relative to resource grants in subframes excluded from the one or more subframes in which sidelink transmissions are expected.

21. The apparatus of claim 15, wherein the sidelink transmission configuration further includes at least one of an indication of a set of slots in one or more subframes, an indication of a set of resource blocks in the one or more subframes, a priority associated with each of the one or more sidelink transmission patterns, a sidelink channel associated with each of the one or more sidelink transmission patterns, a power level for one or more sidelink transmissions, an estimated power headroom for the one or more sidelink transmissions, a periodicity of the one or more sidelink transmissions, a service associated with the one or more sidelink transmissions, and/or combinations thereof.

22. The apparatus of claim 21, wherein the indication of the sidelink transmission pattern includes at least one of the power level for the one or more sidelink transmissions, the estimated power headroom for the one or more sidelink transmissions, or the service associated with the one or more sidelink transmissions.

23. An apparatus for use in a first user equipment, the apparatus comprising:
means for indicating a sidelink transmission pattern to a wireless wide area network (WWAN), wherein the sidelink transmission pattern indicates at least one subframe in which a sidelink transmission is expected;
means for receiving one or more uplink transmission grants from the WW AN based on at least the sidelink transmission pattern;
means for transmitting at least one of first data to a second user equipment on a sidelink channel based on the sidelink transmission pattern, or second data to the WWAN based on the one or more uplink transmission grants; and
means for transmitting a report to the WWAN indicating a number of uplink transmission grants that were not used within a time period due to a prioritization of one or more sidelink transmissions, wherein the report is transmitted when the number of uplink transmission grants that were not used within the time period exceeds a threshold value,
wherein the one or more uplink transmission grants for the WWAN are further based on the report.

24. The apparatus of claim 23, further comprising:
means for transmitting a sidelink transmission configuration to the WWAN, the sidelink transmission configuration including one or more sidelink transmission patterns.

25. The apparatus of claim 24, wherein each of the one or more sidelink transmission patterns indicates one or more subframes in which sidelink transmissions are expected.

26. The apparatus of claim 25, wherein the one or more uplink transmission grants for the WWAN excludes the one or more subframes in which the sidelink transmissions are expected.

27. The apparatus of claim 25, wherein the one or more uplink transmission grants for the WWAN includes smaller resource grants in the one or more subframes in which the sidelink transmissions are expected relative to resource grants in subframes excluded from the one or more subframes in which sidelink transmissions are expected.

28. The apparatus of claim 24, wherein the sidelink transmission configuration further includes at least one of an indication of a set of slots in one or more subframes, an indication of a set of resource blocks in the one or more subframes, a priority associated with each of the one or more sidelink transmission patterns, a sidelink channel associated with each of the one or more sidelink transmission patterns, a power level forone or more sidelink transmissions, an estimated power headroom for the one or more sidelink transmissions, a periodicity of the one or more sidelink transmissions, a service associated with the one or more sidelink transmissions, and/or combinations thereof.

29. The apparatus of claim 23, wherein the sidelink transmission pattern is preconfigured at the first user equipment or dynamically configured by the WWAN.

30. The apparatus of claim 23, further comprising:
means for transmitting third data to a data node on the sidelink channel based on the sidelink transmission pattern.

31. An article of manufacture comprising:
a non-transitory computer readable medium having stored therein instructions executable by a processor of a first user equipment to:
indicate a sidelink transmission pattern to a wireless wide area network (WWAN) wherein the sidelink transmission pattern indicates at least one subframe in which a sidelink transmission is expected,
receive one or more uplink transmission grants from the WW AN based on at least the sidelink transmission pattern,
initiate transmission of at least one of first data to a second user equipment on a sidelink channel based on the sidelink transmission pattern, or second data to the WWAN based on the one or more uplink transmission grants, and
transmit a report to the WWAN indicating a number of uplink transmission grants that were not used within a time period due to a prioritization of one or more sidelink transmissions;
wherein the report is transmitted when the number of uplink transmission grants that were not used within the time period exceeds a threshold value,
wherein the one or more uplink transmission grants for the WWAN are further based on the report.

* * * * *